United States Patent [19]

Garrott

[11] 3,959,953

[45] June 1, 1976

[54] APPARATUS TO DETECT THE PASSAGE OF FERROUS MATERIAL IN CROP HARVESTING MACHINES

[75] Inventor: William L. Garrott, Gainesville, Fla.

[73] Assignee: Sperry Rand Corporation, New Holland, Pa.

[22] Filed: Dec. 4, 1974

[21] Appl. No.: 529,305

[52] U.S. Cl. .............................. 56/10.2; 56/DIG. 1; 56/DIG. 15
[51] Int. Cl.² ........................................ A01D 75/18
[58] Field of Search............... 56/10.2, 10.3, DIG. 1, 56/13.9, DIG. 15

[56] References Cited
UNITED STATES PATENTS

| | | | |
|---|---|---|---|
| 2,749,696 | 6/1956 | Innes | 56/10.3 |
| 3,757,501 | 9/1973 | Bennett, Jr. | 56/10.2 |

*Primary Examiner*—Louis G. Mancene
*Assistant Examiner*—J. N. Eskovitz
*Attorney, Agent, or Firm*—Frank A. Seemar; John R. Flanagan; Joseph A. Brown

[57] ABSTRACT

A ferrous material detector operably associated with a crop harvesting machine including a signal generating means operably associated with the compressing means of a harvester. The signal generating means generates a signal during the normal operation of the harvester and interrupts the signal whenever undesirable objects pass in the vicinity of the compressing means. The ferrous material detector also includes a drive system interrupting means which is activated whenever the signal is interrupted.

22 Claims, 7 Drawing Figures

APPARATUS TO DETECT THE PASSAGE OF FERROUS MATERIAL IN CROP HARVESTING MACHINES

BACKGROUND OF THE INVENTION

1. Field of the Invention

The present invention pertains to an apparatus for detecting the passage of objects composed, at least in part, of ferrous materials such as iron or steel in crop harvesting machines.

2. Description of the Prior Art

Generally, prior art devices for detecting the presence of metallic, ferrous, or other objects have one or more inherent disadvantages rendering them of little value in certain applications, especially in the reliable protection of expensive crop harvesting machinery from tramp metal. Such prior art devices often operate with high excitation frequencies and are quite susceptible to the presence of moisture, various types of vegetation, vibration, or the like. They, therefore, impose on the operator the serious burden of continuous monitoring and adjustment of the calibration of the device. Even at relative low excitation frequencies such detectors are adversely affected to a significant extent by an over-extensive scanning area, thereby rendering them unusable for use where high accuracy, reliability and freedom from generation of false alarms is demanded. Additionally, prior art detection devices are located at positions which, for one reason or another, may fail to adequately detect the presence of incoming foreign objects. An example of a detection device located at a position within a crop harvesting machine, which has been found less than satisfactory, is illustrated in the U.S. patent issued to Bennet, Jr., et al., U.S. Pat. No. 3,757,501. This patent teaches the use of a detection device mounted in the floor plate of the header used with the harvester. This type of positioning permits undesirable objects which may be located on top of the incoming mat of crop material to go undetected. Further, this type of positioning creates the situation where each attachment, i.e. the headers, would have to incorporate the detecting device, rather than it being standard equipment in the body of the forage harvester, thereby increasing the cost to the farmer.

OBJECTS OF THE INVENTION

The principle object of the present invention is to provide a ferrous material detecting device for use with crop harvesting machines which will enable ferrous objects to be detected prior to entering the crop processing means of the harvester.

Another object of the present invention is to provide a ferrous material detecting device operable with crop harvesting machines, which due to its location within the harvesting machine, will insure detection of the material prior to entering the crop processing means of the harvester.

Another object of the present invention is to provide a ferrous material detecting device for use with crop harvesting machines which is positioned within the harvester in such a way as to eliminate the effects of moisture and surrounding spurious noise on the detector.

Another object of the present invention is to provide a ferrous material detecting device operable with crop harvesting machines which will interrupt the operation of the crop harvesting machine whenever ferrous material is detected within the harvesting machine.

Further, it is an object of the present invention to provide a ferrous material detecting device operable with crop harvesting machines which is operably associated with the crop compressing and feeding means of the harvester.

These and other objects and advantages of this invention will be apparent to those skilled in the art after a consideration of the following detailed description taken in conjunction with the accompanying drawings in which the preferred form of this invention is illustrated.

SUMMARY OF THE INVENTION

The present invention is illustrated in a harvesting machine of the type generally referred to as a forage harvester. This particular type of harvesting machine uses a pickup or row crop attachment to deliver crop material from the field and direct it rearwardly to the feed rolls of the harvester. Prior to entering the crop processing means of the harvester, the feed rolls of the harvester compress, direct and channel the crop material into the processing means. The ferrous material detecting device of the present invention includes a signal generating means to generate a signal during the normal operation of the harvester. The signal generating means includes a magnetic-coil means to interrupt the signal whenever undesirable objects pass in the vicinity of the compressing means. The magnetic-coil means of the signal generating means is operably associated with the compressing means in order to scan the incoming crop material as it is being compressed. The above described positioning of the magnetic-coil means enables the scanned area to be substantially reduced thereby enabling a more positive detection of objects which may be entwined in the crop material. The ferrous material detector also includes a drive system interrupting means which is activated whenever the signal is interrupted. Therefore, if during the scanning of the ferrous material an undesirable object passes through the scan area the signal normally generated is interrupted which causes the drive of the harvester to be simultaneously interrupted.

DETAILED DESCRIPTION OF THE PREFERRED EMBODIMENT

INTRODUCTION

The forage harvester, as illustrated in the drawings, is mounted on a generally transverse main frame 20 having a transversely extending square tubular beam 24. Ground engaging wheels 21 and 22 are rotatably mounted on brackets (not shown) at the respective ends of beam 24. The harvester is drawn in direction A by a square tubular hitch 23 pivotally connected to the left end portion of beam 24. A pickup 19 or a row crop attachment (not shown) may be mounted on the right end of the frame for delivering crops to the processing means 25 through the feed roll mechanism 26. The cutterhead operates to process the incoming crop material by chopping the crops into small pieces to form silage. The silage is conveyed to blower 28 by a transverse auger 30 mounted along the rear of the harvester. The blower discharges the chopped crops, as silage, into a trailing wagon (not shown) through a rearwardly extending spout 32.

Power is delivered to the various operating mechanism by a main drive shaft 34 which extends along and above the hitch of the tractor. The main drive shaft 34 is connected to a gearbox 36 mounted on the left end of the harvester. A transverse drive train 38 connects the cutterhead 25 to gearbox 36. The feed roll mechanism 26 is also driven from the transverse drive train through belt and pulley drive 40. Chain and sprocket drive 42, reduction gearbox 44 and serpentine chain arrangement 46. The rear transverse auger 30 is driven from the right side of the cutterhead by chain and sprocket drive 48. The blower is driven directly from a straight through shaft 50 extending from gearbox 36.

MAIN FRAME AND HITCH

The main frame consists of transverse beam 24 and beams 52 and 54 mounted to the left, or outboard, side of the harvester. The beam 54 is aligned and slanted towards the left when viewed in the direction of travel. Rear beam 52 is at an angle to the transverse beam 24 so that beams 52 and 54 converge forwardly. The vertical pivotal connection of the hitch to transverse beam 24 is towards the front of beams 52 and 54 and extends forwardly underneath the hitch positioning member 60.

The main frame also includes an L-shaped support 62 having a strut 64 and a platform portion 66. The strut extends from the beam 52 towards the right end of the harvester. The platform portion 66 extends rearwardly from the strut to beam 24. The platform supports the reduction gearbox 44. On the opposite sides of the feed roll mechanism are two arms 68 and 70 which extend upwardly at an angle from the main beam 24. These supports are fixed in position by welding one end to beam 24 while the other end provides pivot points 69, 71 for either a pickup or row crop attachment. On the forage harvester below the front of feed roll mechanism 26 is a rock shaft 72 rotatably mounted in yokes 74 (only one yoke being shown) on both the side plates of the feed roll mechanism 26 and beam 56. At the feed roll mechanism, the rock shaft has two forwardly extending arms adjacent opposite sides of the feed roll mechanism for supporting, raising and lowering pickup unit 19 or row crop attachment.

The pickup, or crop delivering, unit 19 comprises a conventional rotatable reel 5 on a shaft 6 having a plurality of radially projecting, laterally spaced pickup tines or fingers, such as tine 7. A plurality of conventionally laterally spaced stripping or doffing members (not shown), between which the tines pass as reel 5 rotates the tines into housing 8, lifts the crop into the region of influence of a conventional rotatable auger 9. Auger 9 has oppositely directed helical flights for directing the crop material from both sides of the auger towards its center and into the input of the feed rolls 206, 208. Auger 9 is mounted for rotation on shaft 10.

In the pickup unit shown, the crop material to be comminuted is cut by sickle bar 11, picked up by reel 5 and auger 9 and delivered to feed rolls 206, 208. From the feed rolls the crop material is conveyed in a compressed, mat-like, form to cutterhead 216, where it is comminuted by a rotating array of knives and is conveyed by conveyor 30 to discharge blower 28, and finally into a suitable truck or wagon (not shown).

Also mounted to the main frame is blower casing 80. This casing is located substantially directly behind gearbox 36 and contains therein fan 78 of the blower.

DRIVES

The blower 28 and the cutterhead 25 are connected to the tractor's power take-off through gearbox 36 and drive shafts 34 and 38. The main shaft 50 of the gearbox 36 extends rearwardly fore-and-aft substantially in the direction of drive shaft 34. Shaft 50 is so positioned and aligned that the fan 78 of the blower is driven and supported by this shaft. In the described embodiment the drives are designed for connection of the main shaft 34 to a power take-off of 1000 rpm. However, other speed power take-offs can be used with minor adjustments. The advantages of this design is that the fan is supported by the bearings of the gearbox and separate bearings are not required to support fan 78. This also eliminates the need for a universal joint to accommodate the differences in alignment between the output shaft of the gearbox and the drive shaft of the blower.

The main gearbox 36 also contains a 90° drive shaft 82 through which it delivers power to various components on the outboard side of the harvester. The feed roll mechanism, to be described in detail hereinbelow, is driven from drive shaft 82 through a belt and pulley drive 40, chain and sprocket drive 42, gearbox 44 and serpentine chain arrangement 46.

Connected to the end of drive shaft 82 is universal joint 86. The universal joint secures end 88 of transmission member 90 to shaft 82. Transmission member 90 includes rod 92, the left end of which is connected to the universal joint, and cylinder 94 into which the right end of the rod is inserted. Cylinder 94 contains a rubber seal (not shown) which is placed between the rod and the inner walls of the cylinder. This rubber seal absorbs any harmful torsional forces which may be exerted upon drive train 38. Connected to the other end of the transmission member is a coupling assembly 96. This coupling comprises a U-shaped connector or clevis 98 adapted to receive end 99 of the transmission member. Coupling assembly 96 also includes sleeve 100 and gear 102 rigidly mounted to the sleeve. The sleeve segment of the coupling assembly contains a spring loaded pin (not shown) which operates to secure the coupling to various positions of the first rotatable shaft. In order to drive the cutting reel of the harvester it is simply necessary to insert sleeve 100 over the inboard end of cutterhead shaft 84 and to move pin 104 into its proper position so as to rigidly secure the transmission member to the cutterhead drive.

The power to drive feed rolls 26 is also supplied from drive train 38 and more specifically from shaft 82. Rigidly mounted to shaft 82 is pulley 106. This pulley and an associated pulley 108, mounted on the input shaft of gearbox 44, are interconnected by belt 120. This type of connection provides power from gearbox 36 to gearbox 44. Gearbox 44 is a reduction gearbox and, therefore, output shaft 122 of the gearbox is rotating at a speed less than the speed of shaft 82. Output shaft 122 has pulley 124 rigidly mounted thereon. This pulley supplies power to various components of either pickup attachment 19 or a row crop (not shown). The shaft 122 extends beyond pulley 124 and is journalled for rotation in bearings mounted in brackets 128.

Interposed between pulley 124 and the end of shaft 122 is sprocket 130. This sprocket is one of several which make up the serpentine chain arrangement 46, described below.

Figure 4:
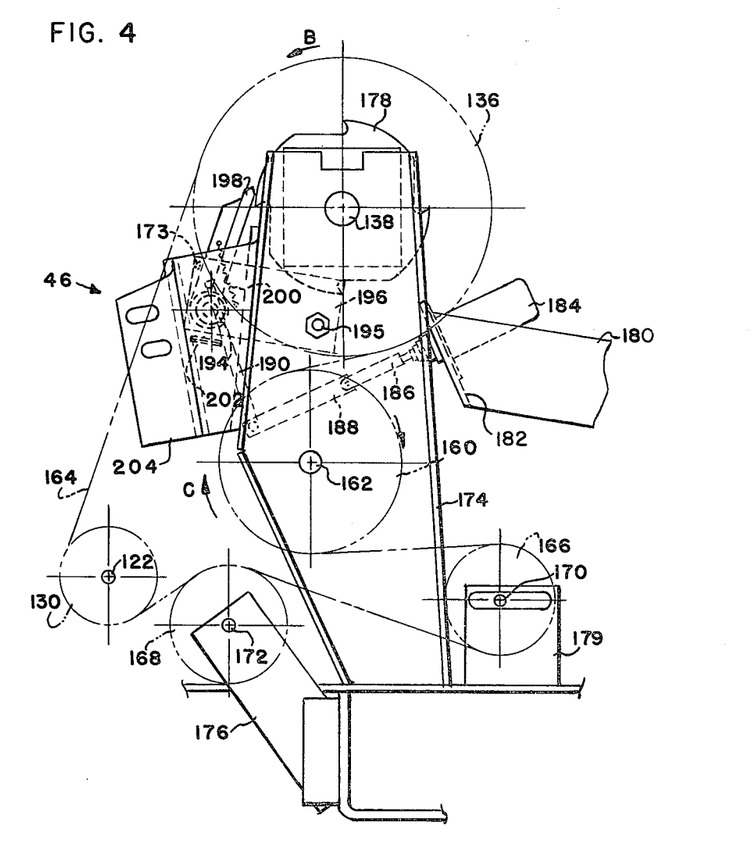
FIG. 4 is an enlarged view of a portion of the forage harvester taken along line 4—4 of FIG. 2.

As shown in FIG. 4, the serpentine chain arrangement consists of five sprockets. Sprocket 130 is rigidly mounted on the output shaft 122 of gearbox 44. The second sprocket 136 is mounted on shaft 138 which is rotatably mounted to the main frame of the harvester. Also mounted to shaft 138 is clevis 142 which is adapted to receive end 144 of the upper feed roll power shaft 132. The other end 146 of shaft 132 is mounted to the rear feed roll shaft 148. This shaft is rotatably mounted in bearings (not shown) contained in the sidewalls of the feed roll housing. Sprocket 150 is rigidly mounted to shaft 148 and interposed between the sidewalls of the feed roll housing and end 146 of shaft 132. The upper front feed roll 206 is mounted on shaft 152 which, is also rotatably mounted between the sidewalls of the feed roll housing.

Sprocket 154 is mounted to shaft 152. Chain 156 interconnects sprockets 150 and 154 so that any motion imparted to the rear upper feed roll shaft, e.g. by power shaft 132, will be simultaneously imparted to the front upper feed roll shaft.

The third sprocket 160 of the serpentine chain arrangement is mounted on rotatable shaft 162. This shaft is journalled to a support mounted to the main frame of the harvester. Interconnected between shaft 162 and the lower feed roll shaft is power shaft 163. The arrangement and construction of the lower feed roll drive mechanism is substantially identical to that described above relating to the upper feed roll driving mechanism. For example, the lower feed roll power shaft is interconnected to the lower rear feed roll shaft 167. A sprocket (not shown) is mounted to this shaft and rotates in conjunction with the rotation of shaft 167. The lower front feed roll is rotatably mounted on shaft 171. This shaft contains sprocket 169 around which a chain (not shown) is placed. This chain is driven from the power shaft 163 thereby causing the lower feed rolls to be simultaneously driven. As stated above, this construction is essentially identical to that used to drive the upper feed rolls. Wrapped around sprockets 130, 136 and 160 is driving chain 164. This chain is wrapped around these sprockets in such a way as to create a counterclockwise rotation indicated by arrow B, in sprocket 136 (which controls the rotation of the upper feed rolls) and a clockwise rotation indicated by arrow C, in sprocket 160 (which controls the rotation of the lower feed rolls). The direction of rotation of the feed rolls creates the gripping and feeding action necessary to direct and convey the incoming crop material into the processing means (i.e. the cutterhead of the harvester). The remaining two sprockets 166 and 168 of the serpentine chain arrangement are idlers. These idlers are mounted on rotatable shafts 170 and 172, respectively. Shaft 170 is rotatably mounted in bearings (not shown) contained in bracket 179 which extends from upstanding frame member 174. Shaft 172 is rotatably mounted to arm 176 which is adjustably mounted to the main frame of the harvester. These idler sprockets can be adjusted so as to tighten the chain 164 around the driving sprockets 130, 136 and 160.

The mechanism to interrupt the operation of the feed roll drive system is illustrated in FIG. 4. Member 180 is rigidly mounted to the main frame of the harvester and supports bracket 182. This bracket supports the barrel end of solenoid 184. Linkage 186 and bar 188 extend forwardly from the barrel of the solenoid. Rod 190 has its lower end mounted to the forwardmost end of bar 188. The upper end of rod 190 is rigidly secured to the lower end of rod 198. A collar 194 is pivotally mounted to bracket 196. The rear end of this bracket is secured by bolt 195 to upstanding frame member 174. Rigidly mounted to collar 194 is an upwardly extending bar 198. This rod is biased towards support 174 by spring 200 and is movable between stops 173. A ratchet 178 is affixed to one side of sprocket 136. During the normal operation of the forage harvester, the solenoid receives a constant signal from the first portion of the signal generating means and is activated thereby maintaining bar 188 in a retracted position. This retracted position of bar 188 causes bar 198 to be removed from engagement with the teeth of ratchet 178. When the signal generated by the first portion of the signal generating means 256 is interrupted due to the passage of undesirable objects through the feed rolls, the solenoid is de-activated thereby allowing spring 200 to move bar 198 into engagement with the teeth of the ratchet. This sudden engagement of the bar with the ratchet causes bracket 196 to be forced downwardly into contact with rubber bumpers 202 mounted on the inner side of bracket 204. Bracket 204 is rigidly mounted to the frame of the harvester, thereby providing a solid support for the bumpers. As soon as bar 198 engages the teeth of ratchet 178, the entire feed roll driving system is immediately interrupted. This stoppage of the driving system causes a clutch (not shown) embodied in gearbox 44 to slip, thereby preventing any damage to the drive train of the harvester.

FEED ROLLS AND CUTTERHEAD

The feed roll mechanism 26 is a generally conventional design with a set of forward feed rollers 206 and 208 for confining, feeding and directing the harvested crop to a pair of rear feed rollers 210 and 212 adjacent shear bar 214. The rear feed rolls feed the crop material into the cutterhead over shear bar 214 for processing (in this instance, chopping) the crop material. The processed crop material is discharged rearwardly to transverse conveyor 30 for delivery to blower 28.

The signal generating means of the present invention consists of a constant signal generating means 256 and a magnetic coil means 215, adapted to interrupt the constant signal generating means whenever undesirable objects move in the vicinity of the feed rolls. The constant signal generating means is similar to the one described and shown in U.S. Pat. No. 3,757,501, assigned to Sperry Rand Corporation, and for this reason will not be described in detail hereinbelow.

Figure 1:
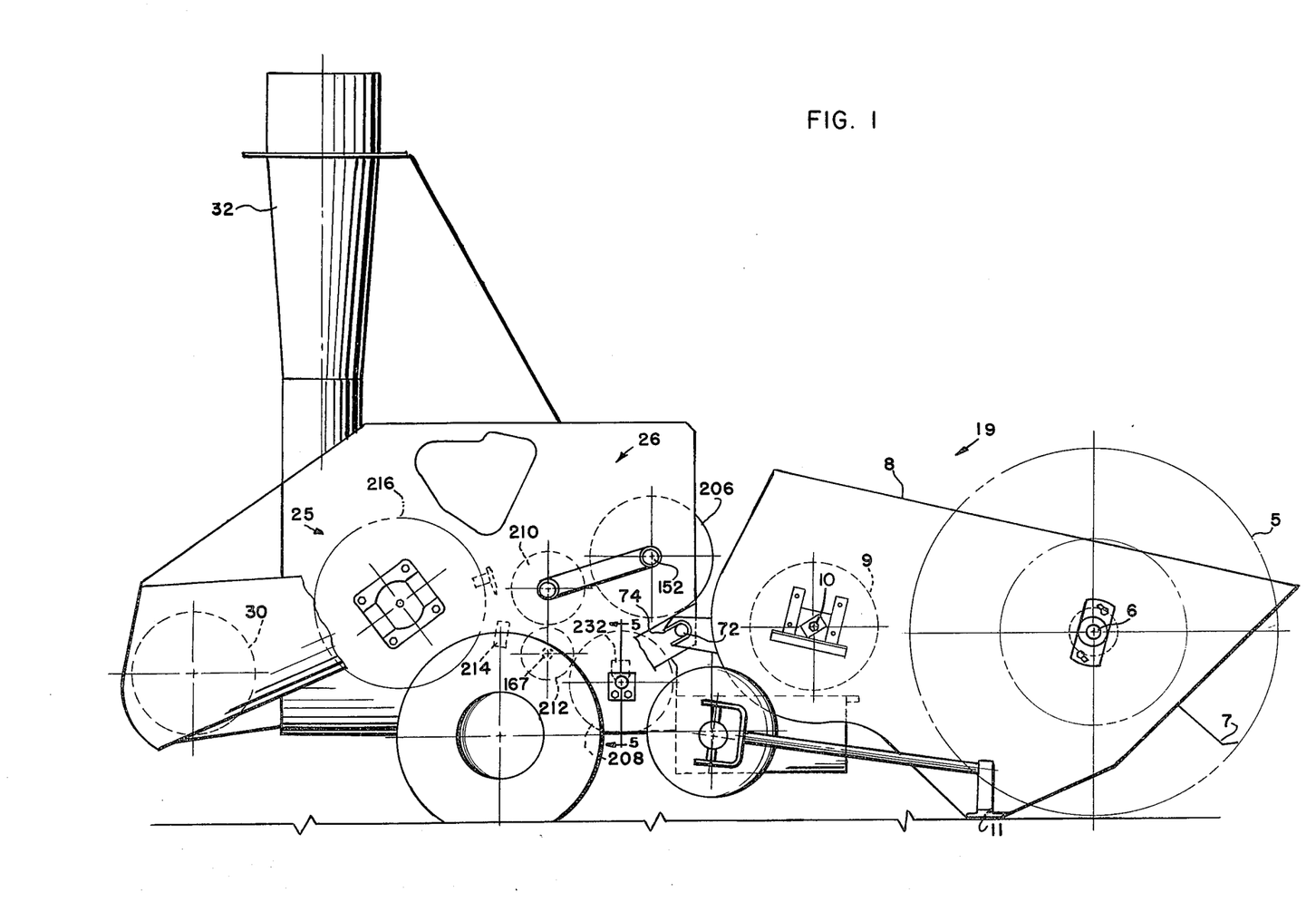
FIG. 1 is a side elevational view, part in cross section, of a forage harvester embodying the invention.
Figure 2:
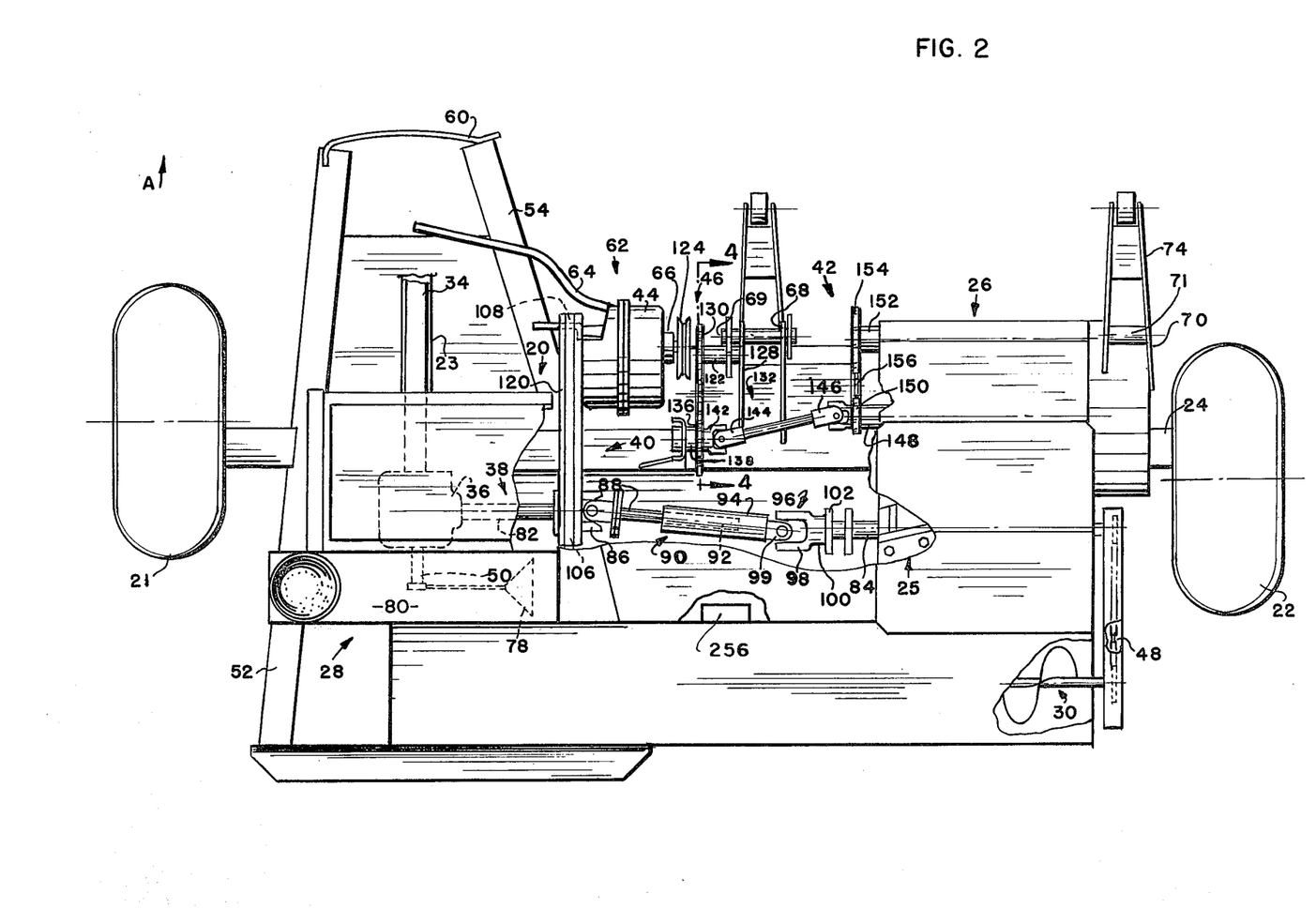
FIG. 2 is a top plan view of a forage harvester.
Figure 3:
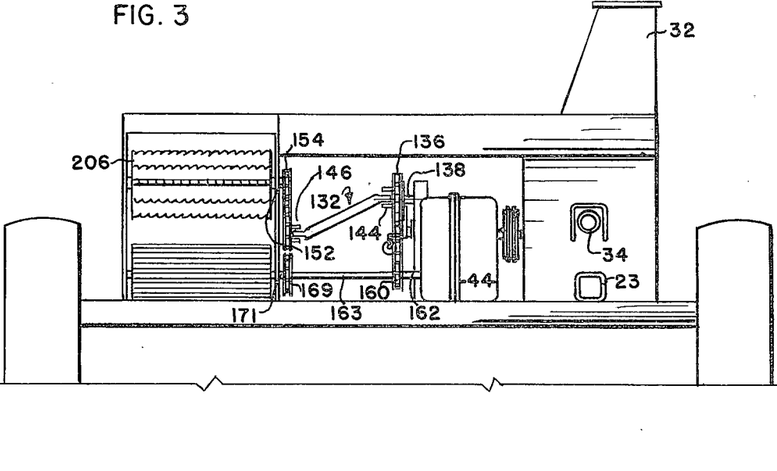
FIG. 3 is a front elevational view of a forage harvester.

The constant signal generating means 256, illustrated in FIG. 2, is stationarily mounted to the rear vertical panel of the harvester. This portion of the signal generating means creates a constant, non-interrupted signal during the normal operation of the harvester, i.e., when no tramp metal is moving through the feed rolls.

Electronically interconnected with the constant signal generating means is the magnetic-coil means 215, stationarily mounted within the lower front feed roll of the harvester. The magnetic-coil means of the present invention is similar in construction to the one described in U.S. Pat. No. 3,757,501, assigned to Sperry Rand Corporation.

Figure 5:
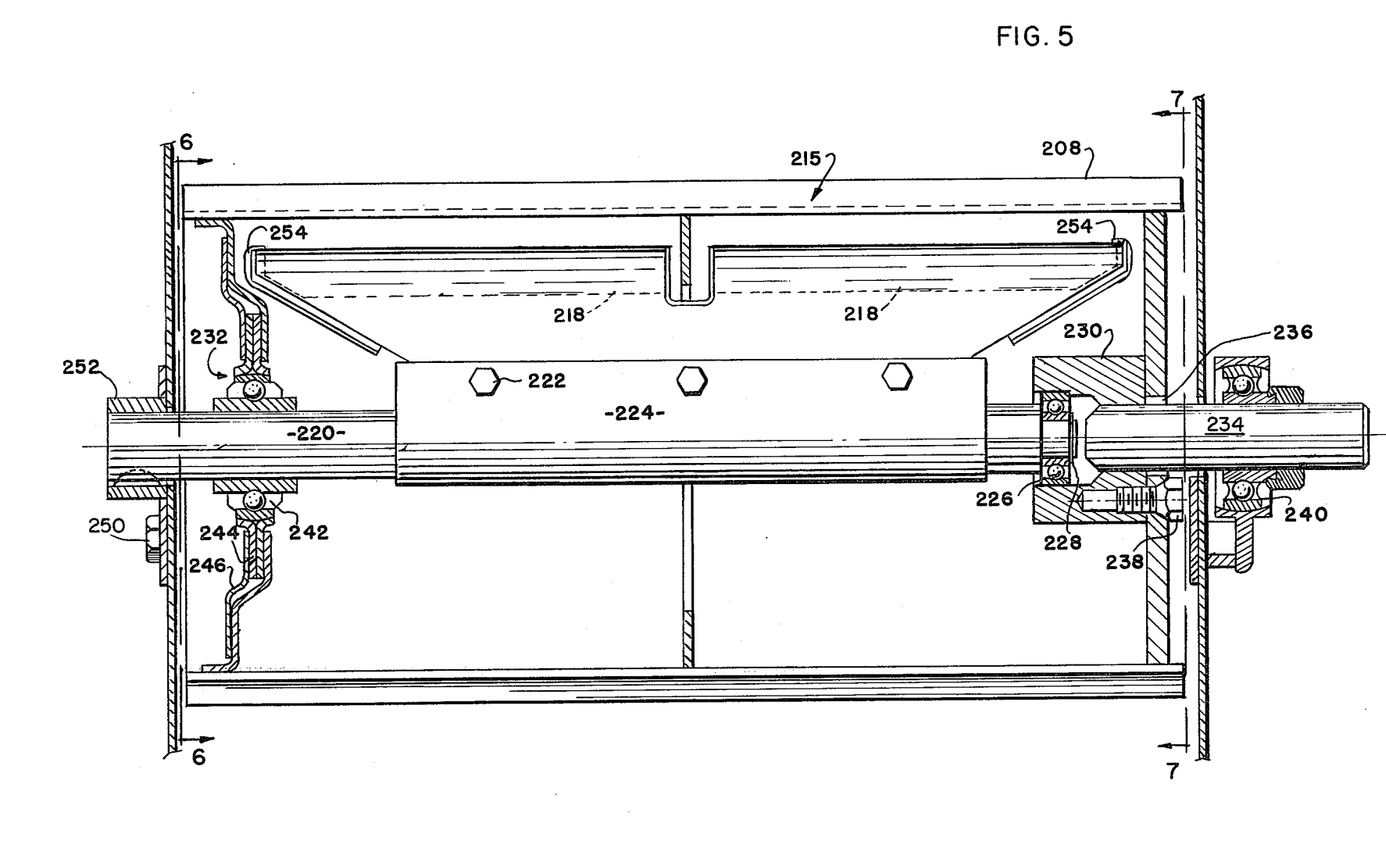
FIG. 5 is a view taken along line 5—5 of FIG. 1 illustrating the components of the signal generating device of the invention.
Figure 6:
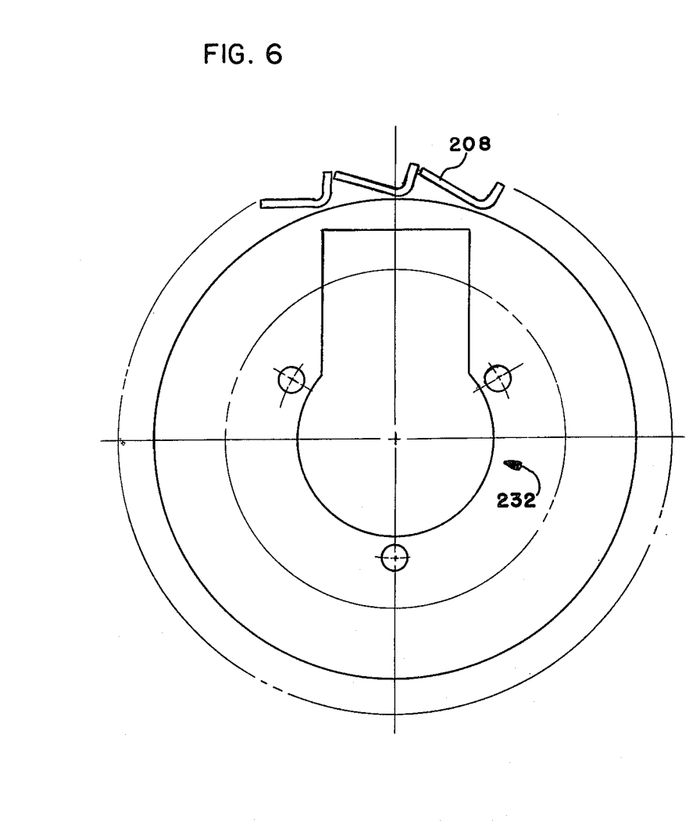
FIG. 6 is an end view taken along line 6—6 of FIG. 5.
Figure 7:
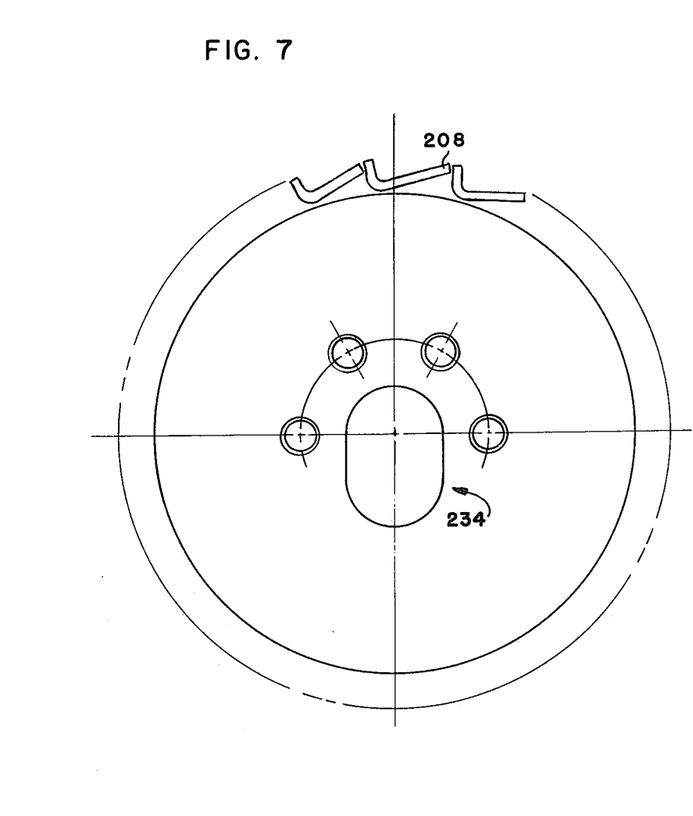
FIG. 7 is an end view taken along line 7—7 of FIG. 5.

The magnetic-coil means consists of a bar magnet 218 around which is wrapped coils of wire (not shown). The magnetic-coil means is rigidly mounted to stationary shaft 220 by bolts 222 which pass through brackets 224. FIG. 6 depicts the outboard, or right end of the feed roll while FIG. 7 depicts the left or inboard side of the feed roll. Prior to its insertion into feed roll 208, shaft 220 is equipped with ball bearings 226 and snap ring 228. Collar 230 is then placed over the bearings and snap ring and inserted through opening 232. Collar 230 contains a splined stub shaft 234 which extends through opening 236 contained in the inboard on left side of feed roll 208. After shaft 234 is inserted through the opening, the collar is secured to the left sidewall of the feed roll by wheel bolts 238. As stated above, the feed roll shafts are supported in bearings mounted to the feed roll casings. FIG. 5 illustrates, bearings 240 which are mounted to the casing and support splined shaft 234.

The right or outboard end of feed roll 208 is equipped with ball bearings 242 and flangette 244. A steel shield 246 is placed on, and secured to, the outside of the flangette and the feed roll. Finally, mounting plate 252 is placed over shield 246 and secured in position by bolts 250. Mounting plates 252 contain a collar adapted to be inserted with a key to secure shaft 220 in a fixed position relative to the feed roll. The mounting arrangement just described enables the feed roll 208 to rotate without having shaft 220 rotate, thereby maintaining the magnetic-coil package 215 in a stationary position within the feed roll.

In order to prevent the magnetic-coil package from detecting any ferrous objects which may be located on the harvester, shields 254 are placed on either side of the magnet. Also, to prevent detection of the feed rolls by the magnet, they, the forward feed rolls, are constructed of magnetically transparent material, e.g. stainless steel.

During the normal operation of the harvester, i.e., when no tramp metal is in the vicinity of the feed rolls, a constant signal is generated by the constant signal generating means 256. This signal is conveyed to solenoid 184 thereby maintaining the solenoid, and, therefore, the entire drive system interrupting means, in a retracted position with respect to ratchet 178. When a ferrous object is delivered to the forwardmost feed rolls, and moves through the field of flux generated by the magnet of the magnetic-coil means 215, a signal is generated and relayed to the constant signal generating means. This signal, when received, interrupts the constant signal, thereby releasing the solenoid casing pin 198 to interrupt the drive to the feed rolls. Therefore, the overall operation of the signal generating means is to activate the drive system interrupting means whenever an undesirable object passes through the compressing, confining and directing means of the harvester.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

Having thus described the invention, what we claim is:

1. A crop harvesting machine comprising:
   a. a frame adapted to travel across a field;
   b. means mounted to the frame for delivering crop material from the field to said frame;
   c. means positioned rearwardly of the delivering means and mounted on said frame for processing the crop material delivered to said frame;
   d. means operably associated with the processing means and positioned between said delivering means and said processing means to compress said crop material;
   e. means for detecting ferrous metal in the immediate vicinity of said compressing means between said delivery means and said processing means; and
   f. means for interrupting the operation of the harvesting machine, said interrupting means being responsive to the detection of ferrous metal in the vicinity of the comprising means by said detecting means.

2. A crop harvesting machine as set forth in claim 1, wherein, said compressing means comprise upper and lower feed rolls laterally disposed on said frame of the harvesting machine.

3. A crop harvesting machine as set forth in claim 1, wherein, the detecting means is mounted within said compressing means.

4. A crop harvesting machine as set forth in claim 1, wherein, the detecting means comprise;
   means for providing a field of flux in the vicinity of the compressing means so that an electronic signal is produced under conditions where a piece of ferrous metal passes through the field of flux, said harvesting machine operation being interrupted in response to the production of said signal.

5. A crop harvesting machine as set forth in claim 4, wherein, the compressing means comprise upper and lower feed rolls laterally disposed on said frame of the harvesting machine and the flux providing means is stationarily mounted within one of said feed rolls.

6. A crop harvesting machine as set forth in claim 4, wherein, the detecting means further comprise:
   means for generating a constant signal; and
   means for relaying said constant signal to said interrupting means during the normal operation of the harvesting machine.

7. A crop harvesting machine as set forth in claim 6, wherein, the constant signal is changed by the signal produced by a piece of ferrous metal passing through the field of flux thereby activating the interrupting means to stop the operation of the harvesting machine.

8. A crop harvesting machine as set forth in claim 7, wherein, said flux providing means is mounted within the compressing means and said constant signal generating means is mounted on the frame of said harvesting machine.

9. A crop harvesting machine comprising:
   a. a frame adapted to travel across a field;
   b. means mounted to the frame for delivering crop material from the field to said frame;
   c. means positioned rearwardly of the delivering means and mounted on said frame for processing the crop material delivered to said frame;
   d. means operably associated with the processing means and positioned between said delivering means and said processing means to compress said crop material;

e. means mounted on said frame adapted to interrupt the operation of the harvesting machine; and f. means operably associated with the compressing means for activating the interrupting means in response to the passage of undesirable objects in the immediate vicinity of said compressing means, said activating means including means for providing a signal during the normal operation of the harvester and means for changing the signal whenever undesirable objects pass in the immediate vicinity of said compressing means, said means for interrupting said signal being positioned within said compressing means.

10. A crop harvesting machine comprising:
a. a frame adapted to travel across a field;
b. means mounted to the frame for delivering crop material from the field to said frame;
c. means positioned rearwardly of the delivering means and mounted on said frame for processing the crop material delivered to said frame;
d. means operably associated with the processing means and positioned between said delivering means and said processing means to compress said crop material;
e. means operably associated with the compressing means for generating a signal during the normal operation of the harvester and for interrupting said signal whenever undesirable objects pass in the immediate vicinity of said compressing means, said generating means include a magnetic-coil means positioned with said compressing means; and
f. means mounted on said frame and adapted to receive said signal during the normal operation of said harvester and further adapted to interrupt the operation of the harvesting machine under conditions where an undesirable object passes in the immediate vicinity of said compressing means.

11. A harvesting machine as described in claim 10 further comprising means mounted to said frame for driving said delivering and said compressing means, the driving means being operably associated with said receiving means so that the operation of said delivering and compressing means is interrupted when said signal is interrupted.

12. A harvesting machine as described in claim 10 wherein said compressing means comprises rotatable feed means mounted to said frame and adapted to compress and feed said crop material into said processing means.

13. A harvesting machine as described in claim 12 wherein said rotatable feed means include a plurality of rollers rotatably mounted to said frame in juxtaposition to each other.

14. An agricultural harvesting machine comprising:
a. a frame adapted to travel across a field;
b. means mounted to the frame for delivering crop material from the field to said frame;
c. means positioned rearwardly of the delivering means and mounted on said frame for processing the crop material delivered to said frame;
d. means mounted to said frame and interposed between said delivering means and said processing means to compress said crop material;
e. signal generating means consisting of a constant signal generating means mounted to said frame of said harvester for providing a constant signal during the normal operation of the harvester and a constant signal interrupting means mounted within said compressing means and adapted to interrupt said constant signal whenever undesirable objects pass through said compressing means; and
f. means mounted on said frame adapted to receive said signal during the normal operation of said harvester and further adapted to interrupt the operation of the harvesting machine under conditions where an undesirable object passes in the immediate vicinity of said compressing means.

15. An agricultural harvesting machine as described in claim 14 wherein said constant signal interrupting means comprises at least one magnet stationarily mounted within said compressing means, the magnets being adapted to generate a magnetic field in the immediate vicinity of said compressing means.

16. An agricultural harvesting machine as described in claim 14 wherein said compressing means are constructed of non-magnetic material in order that the magnetic field generated by said magnets will not be attenuated.

17. An agricultural harvesting machine comprising:
a. a frame adapted to travel across a field;
b. means mounted to the frame for delivering crop material from the field to said frame;
c. means positioned rearwardly of the delivering means and mounted on said frame for processing the crop material delivered to said frame;
d. a plurality of rotatable feeding means interposed between said delivering means and said processing means to feed said crop material into said processing means;
e. means mounted to said frame for driving said delivering means and said feeding means;
f. signal generating means consisting of a constant signal generating means mounted to said frame for providing a constant signal during the normal operation of said harvester and a constant signal interrupting means mounted within said feeding means for interrupting said constant signal whenever undesirable objects pass through said feeding means; and
g. means operably associated with the drive means and adapted to receive said signal during the normal operation of the harvester and further adapted to interrupt the operation of said drive means under conditions where an undesirable object passes in the immediate vicinity of said feeding means.

18. An agricultural harvesting machine as described in claim 17 wherein said rotatable feed means comprises a plurality of cylinders rotatably mounted to said frame in juxtaposition to each other and positioned such that said crop material will move between the cylinders prior to entering said processing means.

19. An agricultural harvesting machine as described in claim 18 wherein said cylinders are constructed of non-magnetic material.

20. An agricultural harvesting machine as described in claim 19 wherein said constant signal interrupting means comprises at least one magnet stationarily mounted within said cylinders and a plurality of coils of wires wrapped around the magnet in such a way as to generate a signal whenever a ferrous object passes through the generated magnetic field.

21. A crop harvesting machine comprising:
a. a frame adapted to travel across a field;
b. means mounted to the frame for delivering crop material from the field to said frame;

c. means positioned rearwardly of the delivering means and mounted on said frame for processing the crop material delivered to said frame, said processing means comprise a cutting reel rotatably mounted to said frame;
d. means interposed between said delivering means and said processing means and mounted to said frame for confining and directing the crop material into said processing means;
e. means operably associated with the confining and directing means for generating a signal during the normal operation of the harvester and for interrupting said signal whenever undesirable objects pass in the immediate vicinity of said confining and directing means; and
f. means mounted on said frame and adapted to receive said signal during the normal operation of said harvester and further adapted to interrupt the operation of the harvesting machine under conditions where an undesirable object passes in the immediate vicinity of said confining and directing means.

22. A crop harvesting machine as described in claim 21 wherein said signal is an electronic impulse.

* * * * *

UNITED STATES PATENT OFFICE
CERTIFICATE OF CORRECTION

Patent No. 3,959,953            Dated June 1, 1976

Inventor(s) William L. Garrot

It is certified that error appears in the above-identified patent and that said Letters Patent are hereby corrected as shown below:

Column 8, line 20, delete "comprising" and insert therefor --compressing--.

Signed and Sealed this

Seventh Day of September 1976

[SEAL]

Attest:

RUTH C. MASON
*Attesting Officer*

C. MARSHALL DANN
*Commissioner of Patents and Trademarks*